Nov. 24, 1969                                                    3,543,193

STRESSED ELASTIC WAVE DELAY LINE

Filed Aug. 29, 1968

INVENTORS A. H. FITCH
A. H. MEITZLER
BY
ATTORNEY

United States Patent Office 3,543,193
Patented Nov. 24, 1970

3,543,193
STRESSED ELASTIC WAVE DELAY LINE
Arthur H. Fitch, Mountain Lakes, and Allen H. Meitzler, Morristown, N.J., assignors to Bell Telephone Laboratories, Incorporated, Murray Hill and Berkeley Heights, N.J., a corporation of New York
Filed Aug. 29, 1968, Ser. No. 756,234
Int. Cl. H03h 9/30
U.S. Cl. 333—30
4 Claims

ABSTRACT OF THE DISCLOSURE

An elastic shear wave delay line in which the reception of signals traversing the propagation path a predetermined number of times is selectively minimized by the application of a suitable pressure perpendicular to the direction propagation and at a 45-degree angle with respect to the direction of shear wave polarization.

This invention relates to an elastic wave delay line wherein the delay medium is stressed in order to reduce the reception level of a signal which has traveled the propagation path between the input and output a prescribed number of times.

BACKGROUND OF THE INVENTION

Elastic wave delay lines are useful in a wide variety of applications. Nondispersive delay lines, for example, are useful as recirculating memory units in information processing systems, and dispersive delay lines are useful in a variety of radar systems and spectrometers.

A typical elastic wave delay line comprises a pair of transducers or transducer gratings elastically coupled to different portions of a delay medium. In operation, an input transducer coverts an electrical signal into an elastic wave signal which propagates through the delay medium to an output transducer. At the output transducer, the elastic wave is reconverted into an electrical signal.

One major design problem associated with these delay lines is that of suppressing the spurious signals, known as multiple-travel signals, which arise as a result of multiple reflections between the input and output facets of the delay line. The signal arising from the first reflection from the input facet, known as the triple-travel signal, is particularly troublesome, and a variety of techniques have been devised for suppressing it. None of these techniques however, has been found completely satisfactory, particularly for use with short, low-loss delay lines.

SUMMARY OF THE INVENTION

The application of pressure to a delay medium can be used to produce elastic birefringence in the medium. An ealstic shear wave traveling in the medium in a direction perpendicular to the pressure axis can be resolved into a pair of mutually perpendicular component waves having different propagation velocities. This phenomenon is utilized in the present invention to rotate the polarization of the signal to be suppressed such that the output transducer is no longer responsive to such signal.

In accordance with the present invention, a shear wave, polarized at 45 degrees with respect to the pressure axis, is launched along the direction perpendicular to the pressure axis. Under the influence of the birefrigence induced by the externally applied pressure, the polarization of the elastic shear wave is altered. By the application of the proper amount of pressure, the polarization can be effectively rotated such that after traveling a predetermined distance, it arrives at the output transducer polarized in a direction perpendicular to the direction of transducer sensitivity. Thus, for example, the pressure can be chosen to selectively minimize the reception of the triple-travel signal. Alternatively, the reception of higher order multiple-travel signals or even the main signal can be selectively minimized in accordance with the invention.

BRIEF DESCRIPTION OF THE DRAWINGS

These and other objects and advantages, the nature of the present invention, and its various features, will appear more fully upon consideration of the various illustrative embodiments now to be described in detail in connection with the accompanying drawings in which.

Similar structural elements are denoted by the same reference numerals in the two drawings.

DETAILED DESCRIPTION

Figure 1:
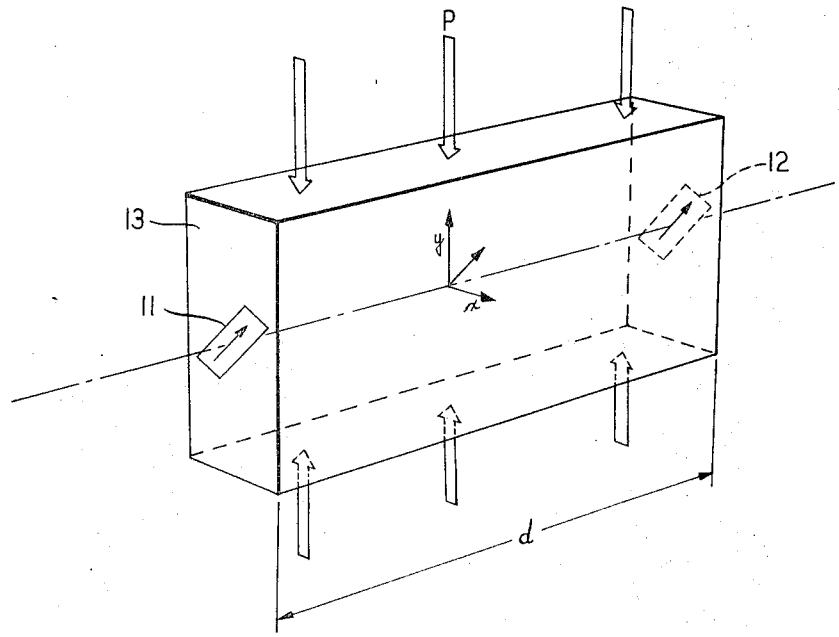
FIG. 1 is a functional illustration of a delay line in accordance with the invention.

In FIG. 1 there is shown a functional illustration of a delay line in accordance with the invention comprising input and output shear wave transducers 11 and 12, respectively, bonded to a body 13 of an elastic wave delay medium.

Tranducers 11 and 12 can be any of the known piezoelectric or polarized ceramic transducers which are cut or polariztion to generate and to selectively receive linearly polarized elastic shear waves. They can be bonded to the delay medium by techniques which are well known in the art.

Body 13 can comprise any one of the well-known isotropic elastic wave delay media. In its simplest form, it will be in the shape of a simple rectangular bar of length $d$; however, more complex geometries including those in which an elastic wave signal is reflected a number of times as it propagates between the input and output transducers are equally useful. In the figure, the transducers 11 and 12 are shown on opposite parallel surfaces of body 13. As is well known, however, with minor modifications in the shape of body 13, the input and output transducers can be on the same surface of the delay medium.

The delay medium of body 13 is stressed to minimize a selected signal by applying to it a presure in such a direction and of sufficient magnitude that the shear wave polariaztion, after traversing body 13 a predetermined number of time, is perpendicular to the direction of maximum sensitivity of the output transducer. This pressure is applied in the direction which is both perpendicular to the direction of shear wave propagation and 45 degrees to the direction of polarization of the shear wave induced by the input transducer. The magnitude of the applied pressure is chosen to produce sufficient anisotropy in the delay medium that the relative phase of the two component waves constituting the linearly polarized shear wave launched by the input transducer are displaced by 180 degrees at the output transducer after propagating along a path of given length, L. The resulting 90-degree rotation of the direction of polarization produces a shear wave motion with particle displacement rotated by 90 degrees at the output transducer 12, thus minimizing the output signal. It can be shown that this pressure, P, is given by the relation:

$$P = \frac{M^2 V}{fL|W+M|} \qquad (1)$$

where M is the shear modulus of elasticity, V is the shear wave phase velocity in the unstressed medium, $f$ is the frequency of the ulttrasonic wave motion, and W is the third order shear elastic constant. For example, if it is desired to minimize the triple-travel signal, the pressure is determined by substituting $L=3d$ into Equation 1. As a specific example, in a fused quartz delay line 10 cm. long, the triple-travel signal travels 30 cm. For such a delay line operating at 200 megahertz, the stress required to minimize the triple-travel signal is approximately 382 pounds per square inch, a pressure which is readily attained in practice.

In operation, the application of pressure, indicated by the heavy arrows in FIG. 1, produces a uniaxial state of stress in the vertical direction in the delay medium. A transverse wave motion having a particle displacement vector at an angle of 45 degrees with respect to the stress axis is introduced into body 13 by shear wave transducer 11.

The linearly polarized acoustic signal introduced into body 13 can be resolved into two components in the directions of the unit vectors, X and Y, indicated in the figure. With an applied stress, the phase velocities of the two components will differ; and, as a result, the displacement vector will, in general, be elliptically polarized. The signal developed at the output transducer is a minimum when the phase of one component wave is retarded an odd multiple of 180 degrees relative to the other. This condition results in the displacement vector at the output transducer being again linearly polarized but rotated 90 degrees to the direction of transducer sensitivity. Thus, for example, the triple-travel signal can be minimized with relatively small loss to the main signal by providing sufficient pressure to retard one displacement component by 60 degrees for each complete passage through the medium. In this case, the relative phase displacement for the main, or one travel signal, will only be 60 degrees and, hence, the main signal will suffer a loss of only about 2.4 db. The triple-travel signal, on the other hand, is found to suffer an increased loss of 35 to 40 db in actual laboratory experiments.

Alternatively, the appropriate pressure for minimizing higher order multiple-travel signals or even the main signal can be determined by substituting the appropriate pathlength, L, in Equation 1.

Figure 2:
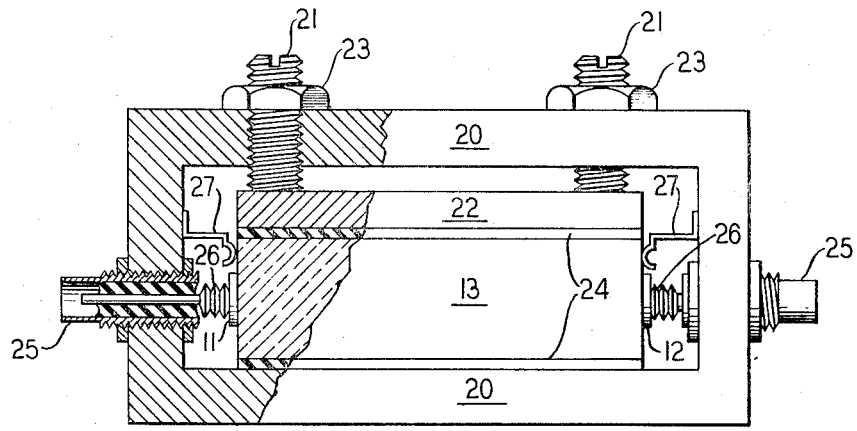
FIG. 2 is a cross section of one illustrative embodiment of an operative delay line in accordance with the invention.

FIG. 2 is a cross section of one illustrative embodiment of an operative delay line in accordance with the invention. It differs from the device of FIG. 1 only in that the structural details are shown.

In FIG. 2, body 13 of delay medium is shown disposed within a main supporting frame 20 which permits the establishment of the required pressure on the medium through the application of pressure from pressure adjustment screws 21 on movable pressure bar 22. Lock nuts 23 can be used to maintain the desired pressure once it is attained. Advantageously, thin rubber strips 24 are disposed between pressure bar 22 and body 13 to secure a uniform pressure distribution. Coaxial connectors and bellows spring contacts 25 and 26 are used to make electrical contact with the top electrodes of transducers 11 and 12, and spring contacts 27 provides contact for the ground electrodes. The operation of this device is substantially the same as that described in connection with FIG. 1.

It is understood that the above-described specific embodiment is illustrative of only one of the many possible specific embodiments which can represent application of the principles of the invention. Numerous and varied other arrangements, particularly variations in the geometry of the delay line, can be devised in accordance with these principles by those skilled in the art without departing from the spirit and scope of the invention.

What is claimed is:

1. An elastic shear wave delay line comprising:
   a body of an isotropic medium supportive of elastic waves;
   means for launching an elastic shear wave into said body;
   means for selectively receiving from said body an elastic shear wave polarized in a preferred direction;
   and means for applying pressure to said medium in such direction and of such magnitude as to linearly polarize said shear wave in a direction perpendicular to said preferred direction after it has traveled a predetermined number of pathlengths in said medium between said launching and receiving means.

2. A delay line according to claim 1 wherein:
   said means for launching an elastic shear wave launches a linearly polarized shear wave in said preferred direction;
   and said means for applying pressure to said medium applies pressure in the direction perpendicular to the propagation path of the wave and at a 45 degree angle with respect to said preferred direction.

3. A delay line according to claim 2, wherein the magnitude of said pressure is given by the relation:

$$P = \frac{M^2 V}{fL|W+M|}$$

4. A delay line according to claim 1, wherein said predetermined propagation path is three times the propagation path of the main signal.

References Cited

UNITED STATES PATENTS

| | | | |
|---|---|---|---|
| 2,898,477 | 8/1959 | Hoesterey | 333—30 |
| 3,488,607 | 1/1970 | Bongiani | 333—30 |
| 3,343,105 | 9/1967 | Van der Pauw | 333—71 |
| 3,277,405 | 10/1966 | Persson | 333—71 |
| 2,867,780 | 1/1959 | Potter | 333—72 |

HERMAN K. SAALBACH, Primary Examiner

C. BARAFF, Assistant Examiner

U.S. Cl. X.R.

310—8.2; 333—71, 72